R. C. WILCOX.
Cane-Stripper.
No. 49,576. Patented Aug. 22, 1865.
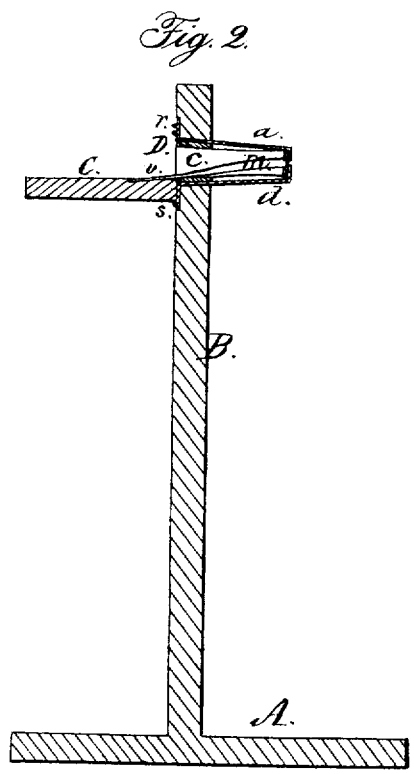
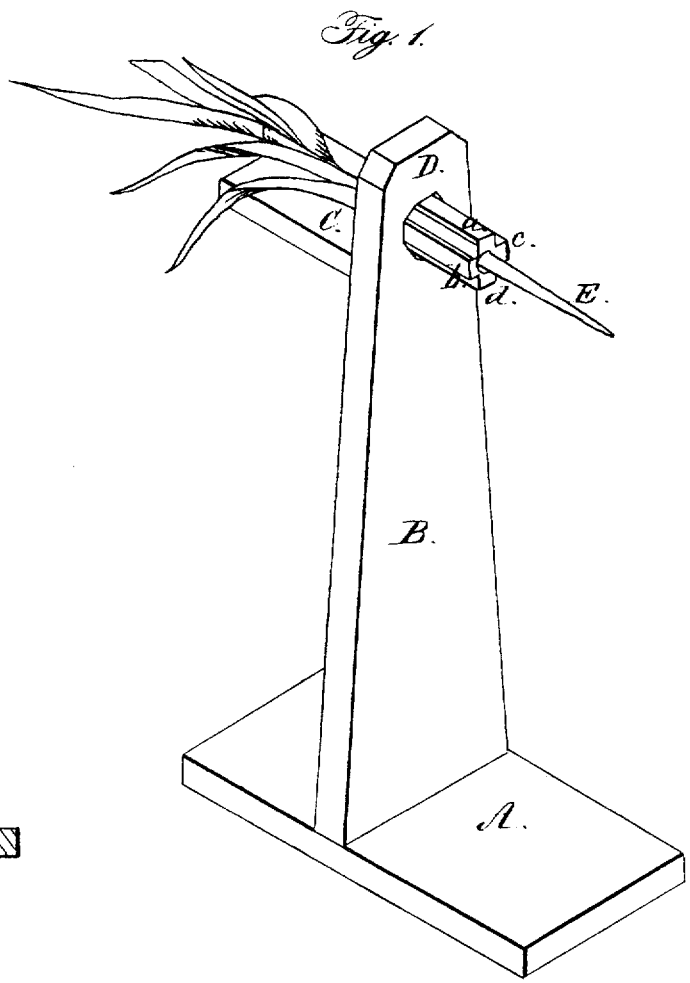
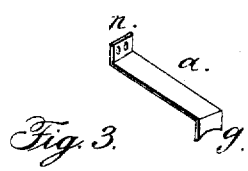
Inventor:
Geo. A Rost
James R Brackett
Inventor:
R C Wilcox
by R Fitzgerald Atty

UNITED STATES PATENT OFFICE.

RICHARD C. WILCOX, OF GUILFORD, CONNECTICUT.

IMPROVEMENT IN APPARATUS FOR STRIPPING SORGHUM.

Specification forming part of Letters Patent No. 49,576, dated August 22, 1865.

*To all whom it may concern:*

Be it known that I, RICHARD C. WILCOX, of the town of Guilford, in the county of New Haven and State of Connecticut, have invented a new and useful Improvement in Apparatus for Stripping Sorghum or Cane; and I do hereby declare that the following is a full, clear, and exact description of the construction, character, and operation of the same, reference being had to the accompanying drawings, which make part of this specification, in which—

Figure 1 is a perspective view of the apparatus complete, showing a stalk of the cane or sorghum as being passed through. Fig. 2 is a section of the same, cut vertically through the center from front to rear, showing the relative positions of the stripping-springs and the guide-spring. Fig. 3 is a perspective view of the shape of the stripping-springs ready to be attached for use.

My improvement consists in fitting four or any other convenient or suitable number of bent springs in such a position that the inner edges of the bent ends of the springs will come in contact with the surface of the stalk, so that when the small or top end is passed in and drawn through those curved edges of the springs will strip all of the leaves from the stalk and leave it clean and ready for grinding; and in fitting a guide-spring on which the small or top end of the stalk will rest and be guided by its trough-like surface through the center and between the bent ends of the four stripping-springs, to enable me to draw it through with ease.

I make the frame of wood or any other suitable material, of a base, A, a standard or upright, B, and a horizontal rest or support, C; and I cut a suitable hole, D, near the upper end of the upright B and immediately above the rest C, to receive and sustain the stripping-springs and guide-spring, all fitted, arranged, and attached substantially as represented in Figs. 1 and 2.

I make the four stripping-springs *a*, *b*, *c*, and *d* of steel properly tempered, and bent substantially into the shape shown in Fig. 3 and indicated in Figs. 1 and 2; and I make the stripping-edges of a curved or concave shape, approximating toward the curve (in cross-section) of the surface of the cane, substantially as represented at *g* and *h*, Fig. 3, so that when the stalk is being drawn through from the small end to the large end, or from tip to butt, the curved edges, as *g* and *h*, will scrape or strip all of the leaves from the stalk, as the edges of the four stripping-springs *a*, *b*, *c*, and *d* will by their curved edges come in contact with all of the leaves.

I make the guide-spring of steel suitably tempered, or of any other suitable material, substantially in the form shown in section at *m*, Fig. 2—that is, I make it curved in the cross-section—suited to receive the convex surface of the stalk of the cane or sorghum, so that it will readily guide the tip or small end to the center and cause it to enter the small opening between the curved edges of the strippers, as indicated in Fig. 1.

Having made the several parts as before described, I attach or secure the stripping-springs *a*, *b*, *c*, and *d* to the standard or upright B at the hole or opening near D, Figs. 1 and 2, by passing screws through the holes *n*, Fig. 3, in the rear end, to confine the end of each spring to the standard, as indicated at *r* and *s*, Fig. 2, or by any other analogous means, so as to hold that end rigidly firm in its place and allow the outer or front end to vibrate as the size of the stalk may require, as indicated in Fig. 1; and I attach the guide-spring *m*, Fig. 2, to the projecting rest or support C, Figs. 1 and 2, by screws, as indicated at *v*, Fig. 2, or in any other suitable way, so as to hold the rear end firm, while the front end, *m*, may vibrate in a suitable manner to serve as a guide in directing the point or small end of the stalk between the vibrating ends of the stripping-springs, when the apparatus will be ready for use. I then pass the tip or small end of the stalk along the guide-spring *m* and out through the stripping ends of *a*, *b*, *c*, and *d*, as shown in Fig. 1, when the stalk may be seized, as at E, and drawn through, while the stripping-edges (as at *g* and *h*, Fig. 3) of the springs *a*, *b*, *c*, and *d* will strip off every leaf, and the stalk will be ready for grinding. Thus two boys may strip the stalks as fast as one can pass them in and the other pull them out through the stripping ends of the springs.

Three, or even two, stripping-springs, with the edges, as at *g* and *h*, Fig. 3, suitably curved, might serve the purpose; but I prefer four, as before described.

What I claim as my invention, and desire to secure by Letters Patent, is—

The guide-spring *m*, in combination with the stripping-springs *a b c d*, all operating as and for the purpose set forth.

R. C. WILCOX.

Witnesses:
R. FITZGERALD,
JAMES R. BROCKETT.